United States Patent [19]

Reade

[11] 4,198,467
[45] Apr. 15, 1980

[54] GLASS ARTICLES WITH $NiFe_2O_4$, $CoFe_2O_4$, OR $(Co,Ni)Fe_2O_4$ SURFACE LAYERS

[75] Inventor: Richard F. Reade, Corning, N.Y.

[73] Assignee: Corning Glass Works, Corning, N.Y.

[21] Appl. No.: 946,809

[22] Filed: Sep. 28, 1978

[51] Int. Cl.$^2$ .............................................. B32B 17/06
[52] U.S. Cl. .................................. 428/410; 428/432; 428/433; 428/539; 428/900
[58] Field of Search ............... 428/410, 432, 433, 900, 428/539

[56] References Cited

U.S. PATENT DOCUMENTS

| | | | |
|---|---|---|---|
| 2,920,971 | 1/1970 | Stookey | 106/39.7 |
| 3,940,531 | 2/1976 | Demarest | 428/432 |
| 3,962,514 | 6/1976 | Rittle | 106/39.8 |
| 4,059,454 | 11/1977 | Reade | 106/39.8 |
| 4,083,709 | 4/1978 | Reade | 65/33 |

Primary Examiner—Ellis P. Robinson
Attorney, Agent, or Firm—Clinton S. Janes, Jr.

[57] ABSTRACT

This invention is concerned with the production of transparent glass articles having compositions in the $Li_2O$ and/or $Na_2O$-$FeO$-$Al_2O_3$-$SiO_2$ field which additionally contain NiO and/or CoO. Upon exposure to a specifically-defined heat treatment in an oxidizing atmosphere, very fine-grained crystallites of $NiFe_2O_4$, $CoFe_2O_4$, or $(Co,Ni)Fe_2O_4$ are formed spontaneously at the surface of the glass article to produce an integral surface layer thereon having a thickness of not more than about several thousand angstroms. These ferrite surfaces can be magnetized in a strong magnetic field and are relatively easily demagnetized. Such capabilities recommend these surface-crystallized glasses for applications in the storing, recording, retrieving, and erasing of information.

2 Claims, No Drawings

GLASS ARTICLES WITH NIFE₂O₄, COFE₂O₄, OR (CO,NI)FE₂O₄ SURFACE LAYERS

BACKGROUND OF THE INVENTION

U.S. Pat. No. 4,059,454 describes transparent glass articles having compositions in the $Li_2O$-$NiO$-$Al_2O_3$-$SiO_2$-$TiO_2$ or $Na_2O$-$NiO$-$Al_2O_3$-$SiO_2$-$TiO_2$ field which, when subjected to a particular heat treatment, will spontaneously exhibit the growth in situ of nickel spinel ($NiO.Al_2O_3$) crystallites throughout the glass body to an amount not exceeding about 5% by volume. It is postulated in that application that NiO inhibits the customary action of $TiO_2$ as a nucleating agent for silicate crystal phases. Instead, a unique interaction takes place between $TiO_2$ and NiO to preferentially cause the production of nickel spinel crystallites which impart a greenish hue to the glass articles.

U.S. Pat. No. 4,083,709 discloses the formation of glass-ceramic articles from glasses having compositions in the $Li_2O$-$Al_2O_3$-$Fe_2O_3$-$SiO_2$-$TiO_2$ field that additionally contain NiO and/or CoO. Such glasses, when heat treated in an oxidizing environment at about 900°–1300° C. in a prescribed manner, crystallize in situ via the simultaneous growth of beta-spodumene solid solution crystals in the interior portion thereof and the growth of $NiFe_2O_4$ and/or $CoFe_2O_4$ crystallites in an integral surface layer thereon. The interior portions of the articles are highly crystalline and the ferrite-containing surface layers do not exceed several thousand angstroms in thickness.

U.S. Pat. No. 3,962,514 discloses the production of glass-ceramic articles having interior portions containing beta-quartz and/or beta-spodumene solid solution as the predominant crystal phase with integral surface layers containing transition metal spinel-type crystals. To illustrate such spinel-type crystals, the patent lists, inter alia, $NiAl_2O_4$, $CoAl_2O_4$, $CoFe_2O_4$, $MnFe_2O_4$, and $CoTiO_3$.

The precursor glasses for such articles are noted as being in the $Al_2O_3$-$SiO_2$ and $Al_2O_3$-$B_2O_3$ base fields with $Li_2O$ or $MnO_2$ constituting the primary modifying oxide. The glasses are nucleated with $TiO_2$ and/or $ZrO_2$ and one or more of the transition metal oxides is included to supply the spinel crystals.

The parent glass articles are body crystallized in situ via heat treating between about 800°–1200° C. Thereafter, the desired integral surface layer containing spinel-type crystals is developed in situ by subjecting the glass-ceramic article to temperatures between about 500°–1000° C. in a reducing atmosphere.

The products of both U.S. Pat. No. 4,083,709 and U.S. Pat. No. 3,962,514 are asserted to display magnetic or ferrimagnetic properties, but each requires a relatively high temperature heat treatment step to convert the precursor glass body into a glass-ceramic article. Moreover, the process of U.S. Pat. No. 3,962,514 requires a subsequent heat treatment of the glass-ceramic article to effect the growth of spinel-type crystals as an integral surface layer. Finally, since the products of those disclosures are glass-ceramics, the physical characteristics thereof more closely approximate those of the crystal phases developed in the interior portions thereof than those of the parent glass.

Objectives of the Invention

The primary objective of the instant invention is to provide a glass article having an integral surface layer containing very fine-grained crystallites of $NiFe_2O_4$, $CoFe_2O_4$, or $(Co,Ni)Fe_2O_4$ such that the article manifests ferrimagnetic properties.

An equally important second objective is to provide a method for making such composite glass articles.

SUMMARY OF THE INVENTION

Those objectives can be accomplished with glasses having compositions within a narrowly-defined segment of the $Li_2O$ and/or $Na_2O$-$FeO$-$Al_2O_3$-$SiO_2$ system which additionally contain NiO and/or CoO. The composite articles consist of an interior glassy portion and an integral surface layer of not more than several thousand angstrom thickness consisting essentially of very fine-grained crystallites of $NiFe_2O_4$, $CoFe_2O_4$, or $(Co,Ni)Fe_2O_4$ dispersed within a glassy matrix.

The operable glass compositions consist essentially, in weight percent on the oxide basis, of about 1–17% $R_2O$, wherein $R_2O$ consists of $Li_2O$ and/or $Na_2O$ in the following indicated proportions when either is present alone of 2.5–5.5% $Li_2O$ and 1–16% $Na_2O$, 1–3.75% FeO, 0.75–5% RO, wherein RO consists of NiO and/or CoO in the following indicated proportions when either is present alone of 0.75–3% NiO and 0.75–4% CoO, 20–32% $Al_2O_3$, and 50–72% $SiO_2$. Such glass formers as $P_2O_5$ and $B_2O_3$ may desirably be present in amounts of up to 10% $P_2O_5$ and up to 3% $B_2O_3$. Fluoride may also be included in amounts up to about 2% as a fluxing agent. The presence of $B_2O_3$ and/or F appears to have the further beneficial effect of promoting the growth of ferrite crystals. $As_2O_3$ is frequently added to perform its customary function as a fining agent. In general, the preferred compositions will consist essentially solely of $Li_2O$ and/or $Na_2O$, FeO, $Al_2O_3$, $SiO_2$, NiO, or CoO with, optionally, $P_2O_5$, $B_2O_3$, and/or F. Furthermore, and very importantly, nucleating agents, e.g., $TiO_2$, $SnO_2$, and $ZrO_2$, will be substantially absent from the compositions such that ferrite surface development will be enhanced and internal crystallization inhibited.

The method for producing such composite articles involves the following three general steps:

(1) a glass-forming batch to provide the above-cited composition ranges is melted;

(2) the melt is simultaneously cooled below the transformation range thereof (optionally to room temperature) and a glass article of a desired configuration shaped therefrom; and (3) the glass article is subjected in an oxidizing environment to a temperature between about 725°–875° C. for a sufficient length of time to cause the growth in situ of nickel ferrite, cobalt ferrite, or cobalt nickel ferrite crystallites in a thin surface layer.

Inasmuch as crystal growth in situ is well-recognized to comprehend a time-temperature relationship, extensive crystallization will require long exposure periods, e.g., up to 24 hours and longer, at temperatures within the cooler extreme of the crystallization range, whereas a period of only 1–2 hours may be necessary at the higher end of the crystallization range.

(In accordance with convention, the transformation range has here been considered as that temperature at which a liquid melt is converted into an amorphous solid, that temperature being deemed to lie in the vicinity of the glass annealing point.)

DESCRIPTION OF PREFERRED EMBODIMENTS

Table I records a number of glass compositions, expressed in parts by weight on the oxide basis, which act to delineate the parameters of the instant invention. Inasmuch as it is not known with which cation(s) the fluoride is combined, it is merely recorded as $AlF_3$, the batch material by which the fluoride was added. Furthermore, since the sum of the individual ingredients equals or closely approximates 100, for practical purposes the compositions may be considered to be reported in terms of weight percent. The actual batch components can comprise any material, either the oxide or other compound, which, when melted together with the other constituents, will be converted into the desired oxide in the proper proportion.

The batch ingredients were compounded in an amount to yield about 1000 grams. The batches were ballmilled to assist in the development of a homogeneous melt and then dispensed into platinum crucibles. The crucibles were covered, placed into a furnace operating at 1550°–1650° C., and the batches melted for about 16 hours with stirring. The melts were subsequently poured into slabs having dimensions about 10"×4"×0.25" and those slabs immediately transferred to an annealer operating at 400°–650° C. A brief dwell period at the higher annealing temperature was customarily employed to relieve strain in the glass without hazarding unwanted, premature, surface devitrification.

$As_2O_3$ was included in the several compositions in its usual capacity as a fining agent.

Table I

| | 1 | 2 | 3 | 4 | 5 | 6 | 7 | 8 |
|---|---|---|---|---|---|---|---|---|
| $SiO_2$ | 68.7 | 64.5 | 60.4 | 61.8 | 61.1 | 63.9 | 62.9 | 69.7 |
| $Al_2O_3$ | 21.9 | 24.7 | 24.5 | 25.1 | 24.8 | 24.5 | 20.7 | 22.3 |
| $Li_2O$ | 4.1 | 4.6 | 4.6 | 4.7 | 4.6 | 3.6 | 2.7 | 5.0 |
| $Na_2O$ | — | — | — | — | — | 1.9 | — | — |
| FeO | 3.0 | 3.3 | 3.3 | 3.4 | 3.3 | 3.3 | 1.9 | 1.0 |
| NiO | 2.1 | 2.3 | 2.3 | 2.3 | 2.3 | 2.3 | 2.0 | — |
| CoO | — | — | — | — | — | — | — | 1.5 |
| $P_2O_5$ | — | — | 4.3 | — | 2.2 | — | 7.4 | — |
| $B_2O_3$ | — | — | — | 2.2 | 1.1 | — | — | — |
| $TiO_2$ | — | — | — | — | — | — | 2.1 | — |
| $As_2O_3$ | 0.3 | 0.6 | 0.6 | 0.6 | 0.6 | 0.6 | 0.3 | 0.5 |

| | 9 | 10 | 11 | 12 | 13 | 14 | 15 | 16 | 17 |
|---|---|---|---|---|---|---|---|---|---|
| $SiO_2$ | 64.5 | 50.9 | 51.3 | 50.7 | 50.6 | 51.3 | 70.4 | 63.0 | 63.0 |
| $Al_2O_3$ | 24.7 | 26.4 | 30.0 | 30.2 | 27.7 | 30.0 | 19.3 | 21.7 | 21.7 |
| $Li_2O$ | 4.6 | — | — | — | — | — | 4.7 | 4.2 | 4.2 |
| $Na_2O$ | — | 13.8 | 15.3 | 12.8 | 15.1 | 14.1 | — | — | — |
| FeO | 2.2 | 1.9 | 1.8 | 2.7 | 1.8 | 2.7 | 1.9 | 3.3 | 2.0 |
| NiO | — | 1.0 | — | — | 0.9 | — | 1.0 | 1.0 | 1.6 |
| CoO | 3.5 | — | 0.9 | 2.8 | — | 1.4 | — | 1.0 | 1.6 |
| $B_2O_3$ | — | 2.4 | — | — | — | — | — | 3.0 | 3.0 |
| $AlF_3$ | — | 2.9 | — | — | 3.1 | — | 2.2 | 2.4 | 2.4 |
| $As_2O_3$ | 0.6 | 0.7 | 0.8 | 0.7 | 0.7 | 0.4 | 0.6 | 0.6 | 0.6 |

Table II recites several heat treatment schedules to which glass articles formed from the exemplary compositions of Table I were subjected, along with a description of the visual appearance of each product after heat treatment, the crystal phases developed in situ as identified through electron diffraction and X-ray diffraction analyses of the thin surface layer, and measurements of remanent flux and coercive force. X-ray diffraction analyses of the body portion of the articles indicated the absence of crystallization therein. Measurements of remanent flux and coercive force were made in the following manner.

The presence of all three transition metal ions, viz., cobalt, nickel, and iron, in the crystallized surface layer of Examples 16 and 17 are determined in the following manner. First, each sample was fired in air. Second, each oxidized sample was reduced by firing in forming gas. Third, the metallic surface layer so formed was stripped away by etching in HCl. This third step involved immersing the specimens into boiling aqueous 50% HCl for a sufficient length of time that evolution of hydrogen gas ceased, commonly a matter of about 10–20 seconds. Hydrogen is liberated according to the reaction

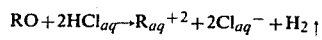

$$RO + 2HCl_{aq} \rightarrow R_{aq}^{+2} + 2Cl_{aq}^{-} + H_2 \uparrow$$

wherein R refers to $Co^{+2}$, $Ni^{+2}$, and $Fe^{+2}$. That the metallic phase has been totally removed from the surface layer is evidenced by the cessation of hydrogen evolution. The samples were then taken out of the acid bath to preclude attack of the glass substrate.

The bath was thereafter evaporated to dryness and the residue therefrom subjected to emission spectrographic analysis. Metallic cobalt, nickel, and iron were identified as being present in each specimen. This result was confirmed through electron spectrometric analyses which also indicated the almost exclusive presence of cobalt, nickel, and iron oxides on the air-fired surfaces and the metallic species of the three elements on the reduced surfaces.

The glass articles were magnetized and the magnetic properties determined by applying a strong magnetic field thereto. The strength of the applied field was increased until the test specimen was magnetically saturated. Thereupon, the applied field was reduced to zero and the degree of permanent magnetism of the sample measured in terms of remanent magnetic flux. The coercive force required to demagnetize the specimen was measured via the application of a magnetic field of increasing strength with reverse polarity. Remanent flux is measured in maxwells/cm and coercive force in oersteds.

The activities reported in Table II were carried out on glass bodies which had been annealed to room temperature to permit an examination of glass quality to be made and to permit test samples to be sawed therefrom. It will be appreciated that this cooling to room temperature is not a critical step for the successful operation of the invention. It is necessary, however, for the glass article to be cooled to a temperature below the transformation range of the glass prior to the crystallization heat treatment in order to insure the development of uniformly very fine-grained ferrite crystallites, i.e., crystallites having diameters less than 1 micron and, customarily, less than 0.5 micron.

The samples were heated from room temperature to the crystallization temperature in an electrically-fired furnace at a rate of about 3°–5° C./minute. It will be appreciated that such modes of heating are illustrative only and not limiting. Faster or slower rates of heating may be employed in accordance with the technical ingenuity of the worker of ordinary skill in the art. Furthermore, the use of specific dwell times and temperatures, as recorded in Table II, is not demanded for suitable surface crystallization. It is only necessary that the glass be exposed to temperatures within the 725°–875° C. interval for a period of time sufficient to generate crystallization in situ.

After satisfactory surface crystallization was achieved, the examples of Table II were cooled to room temperature by simply cutting off the electric current to the furnace and allowing the specimens to cool while being retained within the furnace. This practice is quite prevalent in the laboratory and has been termed "cooling at furnace rate." In general, the rate of cooling has been estimated to average between about 3°–5° C./minute. The use of this means is, again, merely a matter of convenience and ought not to be taken as limiting. The determination of a practical cooling rate is well within the manipulative skill of the ordinary worker in the art.

sharp contrast to magnetite films developed upon glass surfaces which can manifest erratic behavior caused by oxidation at temperatures as low as 200°–300° C.

In general, the nickel ferrite surfaces will exhibit coercive forces less than about 200 oersteds with cobalt ferrite surfaces displaying coercive forces greater than about 1000 oersteds. An examination of Table I in conjunction with Table II, and particularly the remanent flux values reported in the latter table, gives rise to the following observations:

(a) Example 7 illustrates the suppression of ferrite

Table II

| Example | Heat Treatment | Visual Appearance | Crystal Phases | Remanent Flux | Coercive Force |
|---|---|---|---|---|---|
| 1 | 800° C. for 16 hours | Dull gray-brown | $NiFe_2O_4$ | 0.041 | 193 |
| 1 | 850° C. for 16 hours | Dark brown | $NiFe_2O_4$ | 0.054 | 171 |
| 2 | 750° C. for 16 hours | Dull blue-gray | $NiFe_2O_4$ | 0.033 | 158 |
| 2 | 800° C. for 5 hours | Black-brown | $NiFe_2O_4$ | 0.045 | 190 |
| 3 | 750° C. for 16 hours | Dull light gray | $NiFe_2O_4$ | — | — |
| 3 | 800° C. for 5 hours | Black brown | $NiFe_2O_4$ | 0.048 | 188 |
| 4 | 750° C. for 16 hours | Dull violet-gray | $NiFe_2O_4$ | — | — |
| 5 | 750° C. for 16 hours | Light gray | $NiFe_2O_4$ | 0.030 | 165 |
| 5 | 800° C. for 5 hours | Black-brown | $NiFe_2O_4$ | 0.044 | 185 |
| 6 | 750° C. for 16 hours | Dark violet-gray | $NiFe_2O_4$ | 0.030 | 144 |
| 6 | 800° C. for 5 hours | Black-brown | $NiFe_2O_4$ | 0.041 | 185 |
| 7 | 800° C. for 16 hours | Dark brown | $NiFe_2O_4$ | 0.004 | 265 |
| 8 | 850° C. for 16 hours | Medium brown | $CoFe_2O_4 + Fe_2O_3$ | — | — |
| 9 | 800° C. for 5 hours | Dull gray-black | $CoFe_2O_4$ | — | — |
| 9 | 750° C. for 12 hours | Dark brown | $CoFe_2O_4$ | 0.008 | 1271 |
| 10 | 800° C. for 16 hours | Dull gray-brown | $NiFe_2O_4$ | — | — |
| 10 | 750° C. for 12 hours | Metallic gray | $NiFe_2O_4$ | 0.004 | 114 |
| 11 | 750° C. for 12 hours | Glossy black | $CoFe_2O_4$ | 0.036 | 1151 |
| 11 | 800° C. for 16 hours | Glossy black | $CoFe_2O_4$ | 0.040 | 1100 |
| 12 | 750° C. for 12 hours | Glossy black | $CoFe_2O_4$ | 0.054 | 1184 |
| 13 | 750° C. for 12 hours | Glossy black | $NiFe_2O_4$ | 0.005 | 92 |
| 13 | 800° C. for 16 hours | Dull black | $NiFe_2O_4$ | 0.009 | 192 |
| 14 | 750° C. for 12 hours | Glossy black | $CoFe_2O_4$ | 0.052 | 1274 |
| 15 | 800° C. for 5 hours | Olive-brown | $NiFe_2O_4$ | 0.024 | 214 |
| 16 | 775° C. for 5 hours | Black-brown | $(Co,Ni)Fe_2O_4, + Fe_2O_3$ | — | — |
| 17 | 775° C. for 5 hours | Metallic-gray | $(Co,Ni)Fe_2O_4$ | — | — |

As can be observed from Table II, the ferrite surface layers are magnetic as formed. No further treatment thereof is required, as is the case with the products of U.S. Pat. No. 3,962,514, supra. It should also be noted that the coercive forces are relatively low, particularly the nickel ferrite surfaces, thereby indicating that the surface ferrite phase can be magnetized and demagnetized quite easily. The coercive force is sufficiently great, however, that these materials constitute true permanent magnets. The remanent magnetization, or remanent flux, remaining after the magnetizing field is reduced to zero will not be lost by surface abuse or thermal demagnetization. Although no specific values of remanent flux and coercive force were calculated for Examples 16 and 17, both products exhibited typical hysteresis curves, thereby demonstrating good ferrimagnetic properties.

The surface resistivities of the inventive products exceed $2 \times 10^7$ ohms/square, which is considerably higher than those exhibited by integral surface layers of magnetite crystallization on glass bodies as reported in U.S. Pat. No. 4,084,973. The latter bodies exhibit surface resistivities of about $10^3$–$10^4$ ohms/square, those low values resulting from electron transfer between ferrous and ferric ions which leads to a relatively lossy material. The much higher resistivity demonstrated by the nickel and cobalt ferrite surfaces results in materials exhibiting comparatively low loss and, hence, renders them preferred over magnetites for many magnetic applications.

Finally, inasmuch as the crystallites are formed in an oxidizing environment (an atmosphere of air was employed with the work reported in Table II), the ferrite surfaces are oxidation resistant. This characteristic is in development caused by the inclusion of $TiO_2$ in the glass composition, as compared to the superior ferrite development exhibited in Example 15 with equivalent FeO and lower NiO;

(b) Examples 8 and 9 point up the poorer development of $CoFe_2O_4$ crystallites on $Li_2O$-FeO-$Al_2O_3$-$SiO_2$ glasses when compared with $Na_2O$-FeO-$Al_2O_3$-$SiO_2$ glasses, as exemplified by Examples 11, 12, and 14; and, conversely, (c) Examples 10 and 13 show the poorer development of $NiFe_2O_4$ crystallites on $Na_2O$-FeO-$Al_2O_3$-$SiO_2$ glasses when compared with $Li_2O$-FeO-$Al_2O_3$-$SiO_2$ glasses, as exemplified by Examples 1–6 and 15.

I claim:

1. A composite glass article composed of a glassy body portion and an integral surface layer of not more than several thousand angstrom thickness demonstrating ferrimagnetic properties, said surface layer consisting essentially of very fine-grained $NiFe_2O_4$, $CoFe_2O_4$, or (Co, Ni) $Fe_2O_4$ crystallites dispersed within a glassy matrix, said composite glass article having an overall composition consisting essentially, in weight percent on the oxide basis, of about 1–17% $R_2O$, wherein $R_2O$ consists of $Li_2O$ and/or $Na_2O$ in the following indicated proportions when either is present alone of 2.5–5.5% $Li_2O$ and 1–16% $Na_2O$, 1–3.75% FeO, 0.75–5% RO, wherein RO consists of NiO and/or CoO in the following indicated proportions when either is present alone of 0.75–3% NiO and 0.75–4% CoO, 20–32% $Al_2O_3$, and 50–72% $SiO_2$.

2. A composite glass article according to claim 1 wherein said overall composition also contains up to 10% $P_2O_5$, and/or up to 3% $B_2O_3$, and/or up to 2% F.

* * * * *